United States Patent
He et al.

(10) Patent No.: US 11,886,014 B2
(45) Date of Patent: Jan. 30, 2024

(54) TWO-STAGE EXPANDED BEAM OPTICAL COUPLING

(71) Applicants: IMEC VZW, Leuven (BE); Katholieke Universiteit Leuven, KU LEUVEN R&D, Leuven (BE); Universiteit Gent, Ghent (BE)

(72) Inventors: Junwen He, Leuven (BE); Joris Van Campenhout, Leuven (BE); Geert Van Steenberge, Sint-Amandsberg (BE); Jeroen Missinne, Ghent (BE); Yigit Yilmaz, Heverlee (BE); Do Won Kim, Leuven (BE); Douglas Charles La Tulipe, Heverlee (BE)

(73) Assignee: Imec VZW, Leuven (BE)

( * ) Notice: Subject to any disclaimer, the term of this patent is extended or adjusted under 35 U.S.C. 154(b) by 0 days.

(21) Appl. No.: 17/522,203

(22) Filed: Nov. 9, 2021

(65) Prior Publication Data
US 2022/0146756 A1    May 12, 2022

(30) Foreign Application Priority Data
Nov. 9, 2020 (EP) .................................. 20206369

(51) Int. Cl.
*G02B 6/36* (2006.01)
*G02B 6/12* (2006.01)
(Continued)

(52) U.S. Cl.
CPC ........... *G02B 6/36* (2013.01); *G02B 6/12004* (2013.01); *G02B 6/132* (2013.01); *G02B 6/4214* (2013.01)

(58) Field of Classification Search
CPC ...... G02B 6/36; G02B 6/12004; G02B 6/132; G02B 6/4214; G02B 6/264; G02B 6/305; G02B 6/4206; G02B 6/4257
See application file for complete search history.

(56) References Cited

U.S. PATENT DOCUMENTS

| 6,031,953 | A | 2/2000 | Rekow et al. |
| 7,298,941 | B2 | 11/2007 | Palen et al. |

(Continued)

FOREIGN PATENT DOCUMENTS

| CN | 108027482 A | * | 5/2018 | ........... G02B 6/4214 |
| CN | 109655969 A | * | 4/2019 | ........... G02B 6/1228 |

(Continued)

OTHER PUBLICATIONS

Extended European Search Report and Written Opinion, Application No. EP20206369.9, dated Apr. 22, 2021, 8 pages.
(Continued)

*Primary Examiner* — John Bedtelyon
(74) *Attorney, Agent, or Firm* — McDonnell Boehnen Hulbert & Berghoff LLP

(57) ABSTRACT

A silicon-based photonic chip is provided that includes an interface for optically coupling the photonic chip to an optical fiber or an optical fiber assembly. The interface includes: a single-mode waveguide configured to guide light and to provide a first light beam; a first optical element configured to expand the light beam in a first direction in-plane of the photonic chip, thereby providing an expanded light beam; and a second optical element configured to deflect and to further expand the expanded light beam in a second direction, thereby providing an output light beam from the photonic chip. Also provided are methods for fabricating such a photonic chip.

20 Claims, 10 Drawing Sheets

(51) Int. Cl.
*G02B 6/132* (2006.01)
*G02B 6/42* (2006.01)

(56) References Cited

U.S. PATENT DOCUMENTS

| | | | |
|---|---|---|---|
| 9,658,396 B2 | 5/2017 | Rong et al. | |
| 9,664,858 B2 | 5/2017 | Mohammed et al. | |
| 2002/0118907 A1 | 8/2002 | Sugama et al. | |
| 2009/0316275 A1 | 12/2009 | Baugh | |
| 2015/0323748 A1* | 11/2015 | Contag | G02B 6/4204 385/77 |
| 2016/0231518 A1* | 8/2016 | Stiles | G02B 6/4206 |
| 2017/0023752 A1 | 1/2017 | Isenhour et al. | |
| 2017/0307834 A1 | 10/2017 | Mathai et al. | |
| 2018/0017744 A1* | 1/2018 | DeMeritt | G02B 6/4259 |
| 2019/0137703 A1* | 5/2019 | Héroux | G02B 6/4214 |
| 2019/0339450 A1 | 11/2019 | Noriki et al. | |

FOREIGN PATENT DOCUMENTS

| | | | | |
|---|---|---|---|---|
| JP | 2013140205 A | * | 7/2013 | ............ G02B 6/036 |
| WO | 01/81968 A1 | | 11/2001 | |
| WO | 2020/205673 A1 | | 10/2020 | |

OTHER PUBLICATIONS

Noriki, Akihiro, Isao Tamai, Yasuhiro Ibusuki, Akio Ukita, Satoshi Suda, Daisuke Shimura, Yosuke Onawa, Hiroki Yaegashi, and Takeru Amano. "Mirror-Based Broadband Silicon-Photonics Vertical I/O With Coupling Efficiency Enhancement for Standard Single-Mode Fiber." Journal of Lightwave Technology 38, No. 12 (2020): 3147-3155.

Hughes, Mike, Darrell Childers, Dan Kurtz, Dirk Schoellner, Shubhrangshu Sengupta, and Ke Wang. "A single-mode expanded beam separable fiber optic interconnect for silicon photonics." In Optical Fiber Communication Conference, pp. Tu2A-6. Optical Society of America, 2019.

Snyder, Bradley, Guy Lepage, Sadhishkumar Balakrishnan, Peter Verheyen, Marianna Pantouvaki, Philippe Absil, and Joris Van Campenhout. "Broadband, polarization-insensitive lensed edge couplers for silicon photonics." In 2018 IEEE 68th Electronic Components and Technology Conference (ECTC), pp. 841-847. IEEE, 2018.

Han, Sang-Pil, Jin Tae Kim, Suk-Won Jung, Seung-Ho Ahn, Choon-Gi Choi, and Myung-Yung Jeong. "A reflective curved mirror with low coupling loss for optical interconnection." IEEE Photonics Technology Letters 16, No. 1 (2004): 185-187.

Noriki, A., I. Tamai, Y. Ibusuki, A. Ukita, Satoshi Suda, D. Shimura, Y. Onawa, H. Yaegashi, T. Amano, and M. Mori. "Key technology developments of active optical package (AOP) substrate for co-packaging of silicon photonics." In Integrated Photonics Platforms: Fundamental Research, Manufacturing and Applications, vol. 11364, p. 113640S. International Society for Optics and Photonics, 2020.

Suzuki, Takanori, Koichiro Adachi, Tadashi Okumura, Hideo Arimoto, and Shigehisa Tanaka. "A Light Source Using 1.3-$\mu {\rm m} $ Lens-Integrated Surface-Emitting Laser for Silicon Platforms." IEEE Photonics Technology Letters 26, No. 11 (2014): 1089-1091.

Krähenbühl, Roger, Angelique Luu-Dinh, and Rolando Ferrini. "Wafer-scale folded micro-optical interconnects." In 45th European Conference on Optical Communication (ECOC 2019), pp. 1-3. IET, 2019.

Tao, J. F., A. B. Yu, H. Cai, W. M. Zhu, Q. X. Zhang, J. Wu, K. Xu, J. T. Lin, and A. Q. Liu. "Ultra-high coupling efficiency of MEMS tunable laser via 3-dimensional micro-optical coupling system." In 2011 IEEE 24th International Conference on Micro Electro Mechanical Systems, pp. 13-16. IEEE, 2011.

Michael, A., C. Y. Kwok, Md Al Hafiz, and Y. W. Xu. "Optical fibre on a silicon chip." In Current Developments in Optical Fiber Technology. IntechOpen, 2013.

Deng, Chuanlu, Xueting Wang, Ruhuan Zhang, Yi Huang, Xiaobei Zhang, and Tingyun Wang. "Stepped laser-ablation fabrication of concave micromirrors in rectangular optical waveguides for low loss vertical coupling." Optics Express 28, No. 14 (2020): 20264-20276.

Noriki, Akihiro, and Takeru Amano. "Beam waist controlled vertical optical path conversion using integrated curved micro mirror for silicon photonics." Japanese Journal of Applied Physics 59, No. SO (2020): SOOB02.

* cited by examiner

TWO-STAGE EXPANDED BEAM OPTICAL COUPLING

CROSS-REFERENCE TO RELATED APPLICATIONS

The present application is a non-provisional patent application claiming priority to European Patent Application No. EP 20206369.9, filed on Nov. 9, 2020, the contents of which are hereby incorporated by reference.

FIELD OF THE DISCLOSURE

The present disclosure relates to silicon-based photonic chips. The disclosure is concerned with optically coupling such a photonic chip to an optical fiber or to an optical fiber assembly. Accordingly, the disclosure provides a silicon-based photonic chip with an interface for optically coupling the photonic chip to an optical fiber or to an optical fiber assembly, and a method for fabricating the photonic chip.

The photonic chip of the present disclosure is thus suitable for making a fiber optic connection. The photonic chip includes a two-stage optical interface that expands a light beam, which is transported in a single-mode waveguide of the photonic chip, separately in two dimensions.

BACKGROUND

A fiber optic connection to a silicon-based photonic integrated circuit (PIC)— which may be referred to as a "photonic chip"—requires an optical interface that matches the mode in the optical fiber or optical fiber assembly, and that in a waveguide of the photonic chip.

Conventional examples that realize such a fiber optic connection are based on a direct fiber contact interface, which requires a high precision (sub-micron level) alignment. This is an obstacle for high through-put and cost-efficient packaging.

Thus, an expanded beam interface is another attractive alternative, because such an interface can relax the alignment tolerance by expanding and collimating a light beam from the photonic chip to match that from a fiber connector. The expanded beam width (e.g., about 50 µm) can be designed much larger than the mode field diameters of the photonic chip waveguide (e.g., <1 µm) and the optical fiber (e.g., about 9 µm), respectively, so as to effectively reduce optical loss due to misalignment, thus allowing for assembly techniques based on passive alignment.

Many examples of expanded beam interfaces exploit grating couplers with hybrid beam shaping optics, such as micro-lenses. Such grating based optics are unfortunately very limited in their operational bandwidth. As an answer to the increasing need for high data rate traffic, non-grating based optics, such as edge couplers, are thus desired for high bandwidth wavelength division multiplexing (WDM). On the other hand, to enable wafer-level packaging, the expanded light beam interface can adopt a surface coupling (out-of-plane) scheme that makes feasible vision-based alignments, flexible 2D placements, wafer-level testing, etc., all of which are beneficial for viable wafer-level packaging.

SUMMARY

Incorporating an edge coupler into an expanded beam vertical input/output (I/O) interface poses a technological challenge. Since edge couplers are intrinsically edge emitting, a beam deflecting optical system is needed to turn the beam out-of-plane, and to perform the necessary lensing function.

As an example, an inverse-taper silicon edge coupler can be used in conjunction with a 90° turn two-dimensional (2D) curved micro-mirror, to expand and collimate the light beam. Yet, such 2D curved mirrors are hard to manufacture (requiring, for instance, high-precision direct-laser lithography) and/or are difficult to integrate in large scale.

In another example, a 45° mirror is used to deflect a diverging light beam emitting from the edge coupler, and a 2D curved micro lens is further used to collimate the deflected light beam. This example involves the integration of two optical components, i.e., the edge coupler and the 2D curved mirror lens, which inevitably adds to the complexity of the overall system. The micro-lens assembly also inevitably adds to the height profile and topology of the photonic chip, making it hard to co-integrate it with other planar processes (such as molding, flip-chip, grinding, polishing, etc.) or with module components (such as heatsink, co-packaged electronic chiplets, etc).

In view of the above-mentioned challenges and problems, the embodiments described herein provide an improved photonic chip with an interface to couple the photonic chip to an optical fiber or optical fiber assembly. Thereby, objectives are, in particular, to design the interface such that it enables high bandwidth, is easy to manufacture, has a high misalignment tolerance, allows wafer-level packaging, and allows integration with other planar processes or with module components.

In an example embodiment, a photonic chip includes an optical interface, which is based on a two-stage beam expansion with optional focusing and/or collimation. The interface provides an in-plane light beam expansion and a separate out-of-plane light beam expansion (wherein in-plane and out-of-plane relate to the plane of the photonic chip, i.e., the plane in which its layers are fabricated). Embodiments described herein provide the interface for coupling the photonic chip to an optical fiber or optical fiber assembly, wherein the interface may comprise a non-grating based expanded beam edge coupler for broadband polarization-insensitive high-alignment-tolerance manufacturable single mode applications.

A first aspect of the present disclosure provides a silicon-based photonic chip comprising an interface for optically coupling the photonic chip to an optical fiber or an optical fiber assembly, wherein the interface comprises: a single-mode waveguide configured to guide light and provide a light beam; a first optical element configured to expand the light beam in a first direction in-plane of the photonic chip, in order to provide an expanded light beam; and a second optical element configured to deflect and at the same time further expand the expanded light beam in a second direction, in order to provide an output light beam from the photonic chip.

The photonic chip of the first aspect is thus configured to partition the light beam expansion process, whereby the beam is expanded in two dimensions, into a two-stage process comprising two separate one-dimensional (1D) light beam expansion steps. That is, a first in-plane expansion step provided by the first optical element, and a second out-of-plane expansion step provided by the second optical element. The first and the second optical elements are two separate optical components of the photonic chip, and each optical element may beneficially be specified to improve its respective optical functionality. The first optical element (the in-plane optics) may be patterned on chip such that the first optical element does not significantly add to the complexity of total integration. Compared with a single 2D optical expansion element, a 1D optical expansion element (e.g., a curved mirror) is a more easily and cost-effectively manufacturable option, with a more accessible and controllable pool of fabrication measures. Accordingly, the photonic chip becomes easier to manufacture. The light beam size may be expanded by up to 2 orders of magnitude or more, thus, it can provide good alignment tolerance and viable integration schemes for wafer-level packaging. Since non-grating based optical elements can be used, a high bandwidth is additionally enabled.

In an implementation of the optical chip, the first optical element is further configured to shape the expanded light beam; and/or the second optical element is further configured to shape the output light beam.

For example, the first optical element may collimate and/or focus the expanded light beam. Alternatively or additionally, the second optical element may collimate and/or focus the output light beam.

In an implementation of the optical chip, the second optical element is configured to deflect the expanded light beam by an angle in a range of 80°-100°; and/or the second direction is substantially perpendicular to the first direction.

A propagation direction of the expanded light beam may accordingly be changed by 80°-100° by the deflection by the second optical element. For instance, the angle of deflection may be about 90°. Further, the second direction and the first direction may span an angle in a range of 85°-95° (substantially perpendicular), or of 90°.

In an implementation of the optical chip, the light beam has a beam diameter in a range of 0.5-1.5 μm; and the output light beam has a beam diameter larger than 10 μm.

Thus, the light beam is expanded increasing the diameter up to a factor of 20, or more. Thus, the output light beam can couple to the optical fiber or optical fiber assembly. Further, alignment tolerance between the photonic chip and the optical fiber or optical fiber assembly is provided. Notably, most generally, the output light beam may have a diameter that is equal to or larger than the diameter of a standard single-mode optical fiber.

In an implementation of the optical chip, the first optical element is silicon-based and patterned on a silicon-based substrate of the photonic chip.

Notably, a silicon-based optical element or substrate may include a silicon-nitride-based optical element or substrate. By patterning the first optical element on the photonic chip, the overall integration complexity can be reduced.

In an implementation of the optical chip, the second optical element is integrated with or inserted into a silicon-based substrate of the photonic chip.

This allows a simple integration of the second optical element was the photonic chip, and thus leading to an overall low integration complexity.

In an implementation of the photonic chip, the second optical element is arranged within the dimension of thickness of the silicon-based substrate.

In particular, this means that the second optical element can avoid modifying the topography of the substrate in an undesirable manner. Accordingly, a size and especially a thickness, of the photonic chip can be kept small. Further, the photonic chip can be well integrated with other planar processes or with module components.

In an implementation of the optical chip, the output light beam is adapted to be coupled into the optical fiber or the optical fiber assembly.

In an implementation of the optical chip, the first optical element is formed in-plane of the photonic chip and comprises at least one of: a convex lens; a graded index lens; a slab coupler evanescently coupled to the single-mode waveguide; a light reflective element or micro-mirror.

In an implementation of the optical chip, the second optical element comprises at least one of: a cylindrical light-reflective element; a metallized polymer structure; a micro-mirror.

In an implementation of the optical chip, the second optical element comprises a curved lens with an integrated mirror.

In an implementation of the optical chip, the curved lens is a 1D curved lens and the integrated mirror is a 45° mirror.

For instance, the curved lens may be a 1D curved lens on one side, and the integrated mirror may be a 45° mirror that may be precisely aligned to the 1D curved lens on the other side. For example, the center of the mirror may be aligned with a focal line (1D) of the lens. Further, it may be easier and faster to place the lens on the photonic chip.

With such a second optical element, the manufacturability of the photonic chip may be improved. For example, it may be easier to place and accurately align the second optical element on the photonic chip. In this case, the beam expansion is separated into the in-plane beam expansion with the first optical element and the out-of-plane beam expansion with the curved lens having the integrated mirror. The two-stage process, which comprises the two separate light beam expansion steps, relaxes the assembly accuracy requirement of the optical chip, and thus also relaxes the precision requirement of the manufacturing tools used for manufacturing the photonic chip, and also reduces the cycle time.

In an implementation of the optical chip, the first optical element comprises or is the graded index lens, and the second optical element comprises or is the curved lens with the integrated mirror, for example, the 1D curved lens with the integrated 45° mirror. This implementation form improves the manufacturability of the optical chip.

In an implementation, the optical chip further comprises a trench arranged at least partly between the first optical element and the second optical element, wherein the trench is arranged such that a path of the expanded light beam from the first optical element to the second optical element goes through at least a part of the trench.

In an implementation of the optical chip, the second optical element is arranged in the trench.

Notably, the trench may be empty, e.g., it may be "filled" with air or some other ambient environment or may be "filled" with vacuum if the device is disposed in a vacuum.

In an implementation, the photonic chip further comprises a dielectric material provided in at least a part of the trench and surrounding at least partly the second optical element.

Thus, the second optical element is better protected. The dielectric material can fill the trench completely, and/or may surround the second optical element completely.

In an implementation of the optical chip, the second optical element comprises an edge coupler arranged at an edge of the photonic chip, the edge being locally defined by the trench.

A second aspect of the present disclosure provides a method for fabricating a silicon-based photonic chip comprising an interface for optically coupling the photonic chip to an optical fiber or an optical fiber assembly, wherein the method comprises: fabricating a single-mode waveguide configured to guide light and provide a light beam; fabricating a first optical element, wherein the first optical element is arranged and configured to expand the light beam in a first direction in-plane of the photonic chip, in order to provide an expanded light beam; and fabricating a second optical element, wherein the second optical element is arranged and configured to deflect and at the same time further expand the expanded light beam in a second direction, in order to provide an output light beam out of the photonic chip.

The method of the second aspect provides the photonic chip of the first aspect and may be extended by respective implementations as described above for the device of the first aspect. Further, the method of the second aspect provides the potential for wafer-level fabrication.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
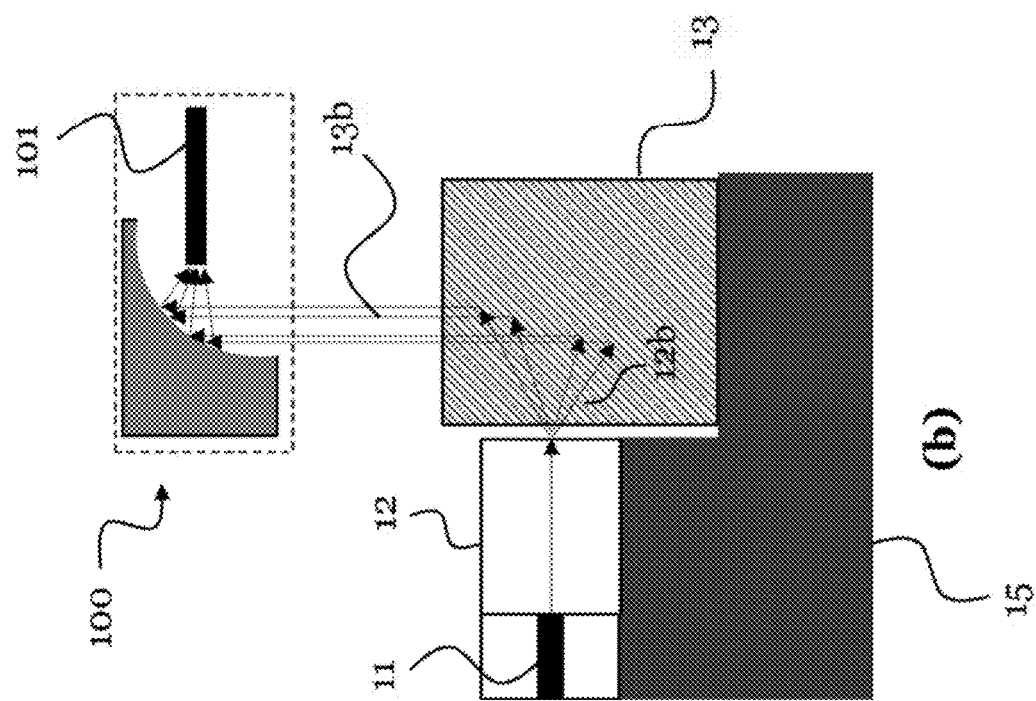
FIG. 1 shows a photonic chip according to an example embodiment.
Figure 1:
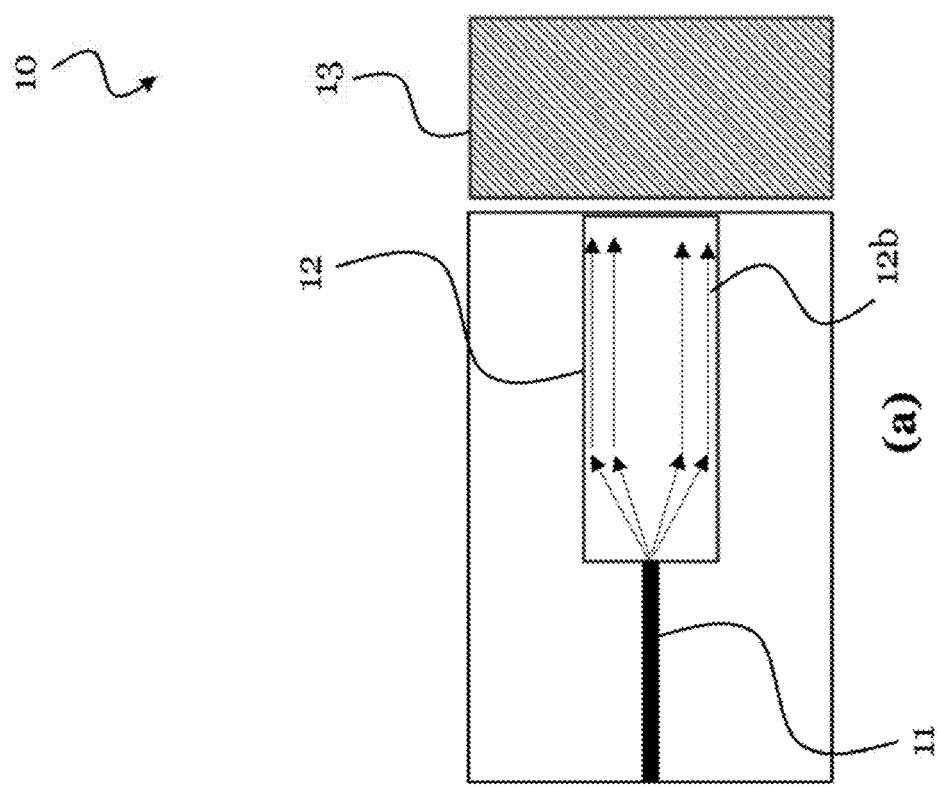

FIG. 1 shows a photonic chip 10 according to an example embodiment. In particular, FIG. 1(a) shows a top-view of the photonic chip 10 and FIG. 1(b) shows a cross-section of the photonic chip 10. The photonic chip 10 is a silicon-based photonic chip 10. The optical chip 10 comprises an optical interface, which is configured to optically couple to an optical fiber 101 or to an optical fiber assembly 100. That is, the optical interface is configured to optically couple the photonic chip 10 to the optical fiber 101 or the optical fiber assembly 100. Notably, the optical fiber assembly 100 may include the optical fiber 101, or may include a plurality of optical fibers 101, for instance, a fiber bundle.

The photonic chip 10 comprises a single-mode waveguide 11, which is configured to guide light, and to provide or output a light beam. For instance, the waveguide 11 may be provided on a substrate 15 of the photonic chip 10, or may be included in the substrate 15 (wherein the substrate 15 may be a silicon-based substrate, e.g., comprising silicon, silicon nitride or silicon dioxide), and may be able to transport the light through the photonic chip 10. For example, the light may be provided by a laser. The waveguide 11 may comprise a waveguide core that is surrounded by a cladding. For example, the waveguide core may be made from silicon nitride, and the cladding may be made from silicon dioxide.

The photonic chip 10 further comprises a first optical element 12, which is configured to expand the light beam in a first direction, in-plane of the photonic chip 10, in order to provide an expanded light beam 12b. That is, the first optical element 12 may be a first beam expansion stage of the two-stage beam expansion process implemented by the photonic chip 10. The first optical element 12 may thus provide a first 1D light beam expansion. The first optical element 12 may comprise one or more optical components, wherein the optical components may include at least one of a convex lens, a graded index lens, a slab coupler, a light reflective element, a mirror, and a micro-mirror. The first optical element 12 with one or more of these components may be patterned on the photonic chip 10, in particular, on the substrate 15. The first optical element 12 may further collimate the expanded light beam 12b, or may focus the expanded light beam 12b, or may collimate and focus the expanded light beam 12b.

The photonic chip 10 further comprises a second optical element 13, which is configured to deflect and to further expand the expanded light beam 12b in a second direction, in order to provide an output light beam 13b from the photonic chip 10. That is, the second optical element 13 may be a second beam expansion stage of the two-stage beam expansion process implemented by the photonic chip 10. The second optical element 13 may thus provide a second 1D light beam expansion. The second optical element 13 may comprise one or more optical components. The optical components may include at least one of a cylindrical light-reflective element, a metallized polymer structure, and a micro-mirror. The second optical element 13 with one or more of these components may be inserted into the substrate 15, or may be integrated with the substrate 15 of the photonic chip 10, in particular, into or with a region of the substrate 15 that is adjacent to another region where the first optical element 12 is patterned. The second optical element 13 may further collimate the output light beam 13b, or may focus the output light beam 13b, or may collimate and focus the output light beam 13b.

In the above-described manner, the photonic chip 10 can be configured to divide a beam expansion (optionally including collimation and/or focusing), which is in total a 2D expansion process, to a two-stage process comprising two separate 1D light beam expansion steps (and optionally collimation and/or focusing steps), i.e. first in-plane and then out-of-plane of the photonic chip 10. Thereby, two separate optical elements—namely, the first optical element 12 and the second optical element 13—are employed.

In the following, the first stage of the two-stage expansion processes, i.e., the in-plane beam expansion of the light beam, which is provided by the waveguide 11, into the expanded light beam 12b by the first optical element 12 is described in more detail.

Figure 2:
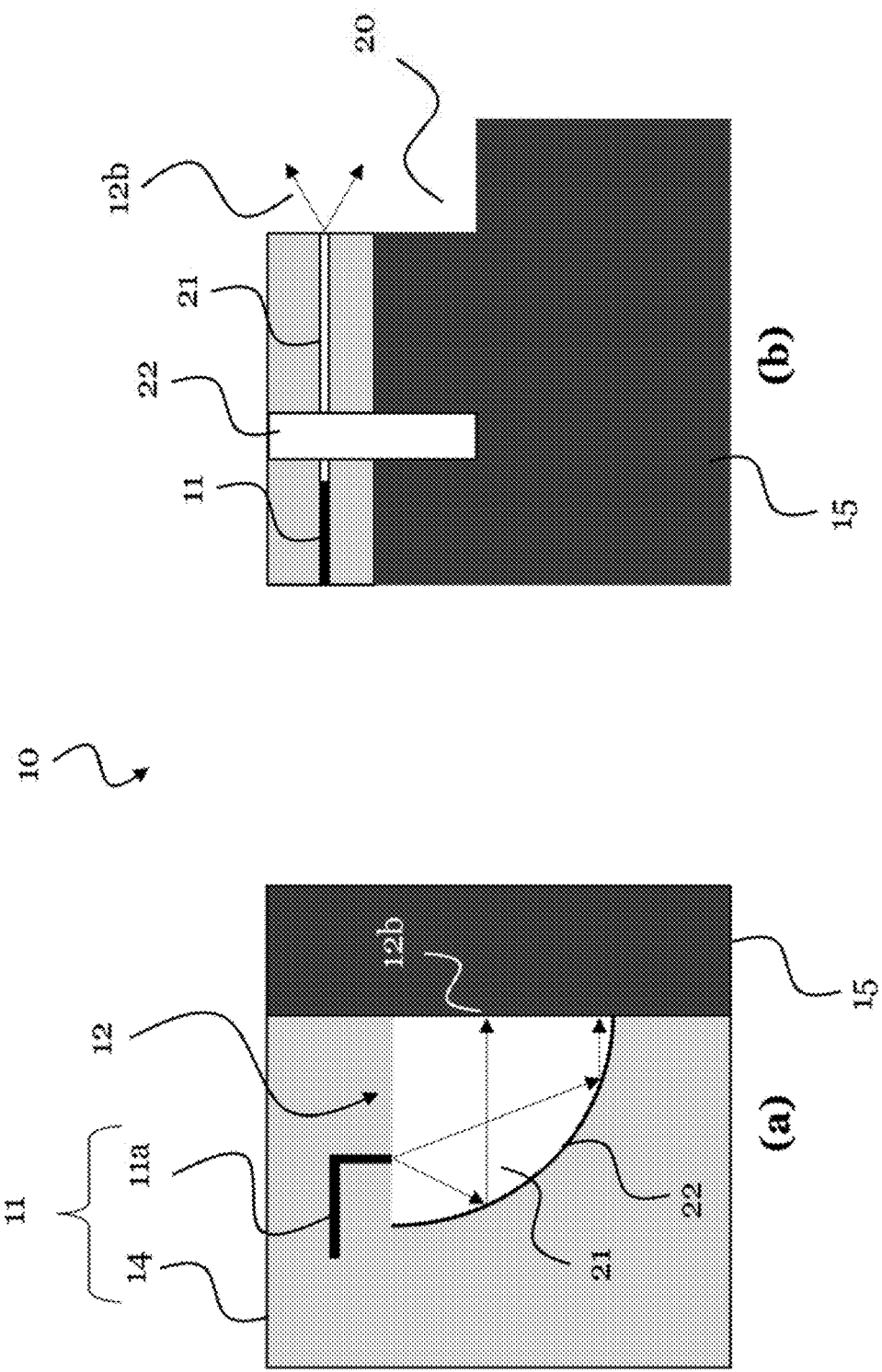
FIG. 2 shows an example of a first optical element of a photonic chip according to an example embodiment.

The waveguide mode from the photonic chip 10, i.e. the mode of the light guided in the waveguide 11, may be transformed by a planar edge coupler (as an example of implementing the first optical element 12), so that the light may continue to be guided vertically (i.e., the light is vertically confined, wherein vertically relates to the growth/fabrication direction of the photonic chip 10 starting from the substrate 15), but can expand horizontally (i.e., in-plane of the photonic chip 10). In addition, the phase front of the expanded light beam 12b may be shaped to be parallel (collimated). Further, as shown in FIG. 2(b), the expanded light beam 12b may be provided to a trench facet. That is, the edge coupler 12 may be arranged at an edge of the photonic chip 10, wherein the edge may be defined by a trench 20, and the edge thus defines the trench facet. The expanded light beam 12b may be pseudo-collimated emitting from the trench facet. There are multiple ways to materialize such an edge coupler, including but not limited to the examples shown in FIG. 2-5.

FIG. 2 shows an example of a first optical element 12 of a photonic chip 10 according to an example embodiment, wherein the first optical element 12 is implemented as an edge coupler. FIG. 2(a) shows a top-view of the photonic chip 10 and FIG. 2(b) shows a cross-section of the photonic chip 10.

In particular, in the example of FIG. 2, the first optical element 12 is based on an in-plane micro mirror edge coupler. The single-mode waveguide 11 comprises exemplarily a waveguide core 11 and a cladding 14, which is provided on the substrate 15. The waveguide 11, and thus the light beam, is brought abruptly or tapered into a slab region 21. An in-plane mirror 22 is then used (see FIG. 2(a)) to deflect and collimate the light beam. In the example, the light beam is deflected towards the facet of the trench 20 (see FIG. 2(b)) as the expanded light beam 12b. In this example, the first optical element 12 comprises the slab region 21 and the in-plane mirror 22. The slab region 21 may be surrounded by the cladding 14. The in-plane mirror 22 may extend through the cladding 14, and may optionally extend into the substrate 15.

Figure 3:
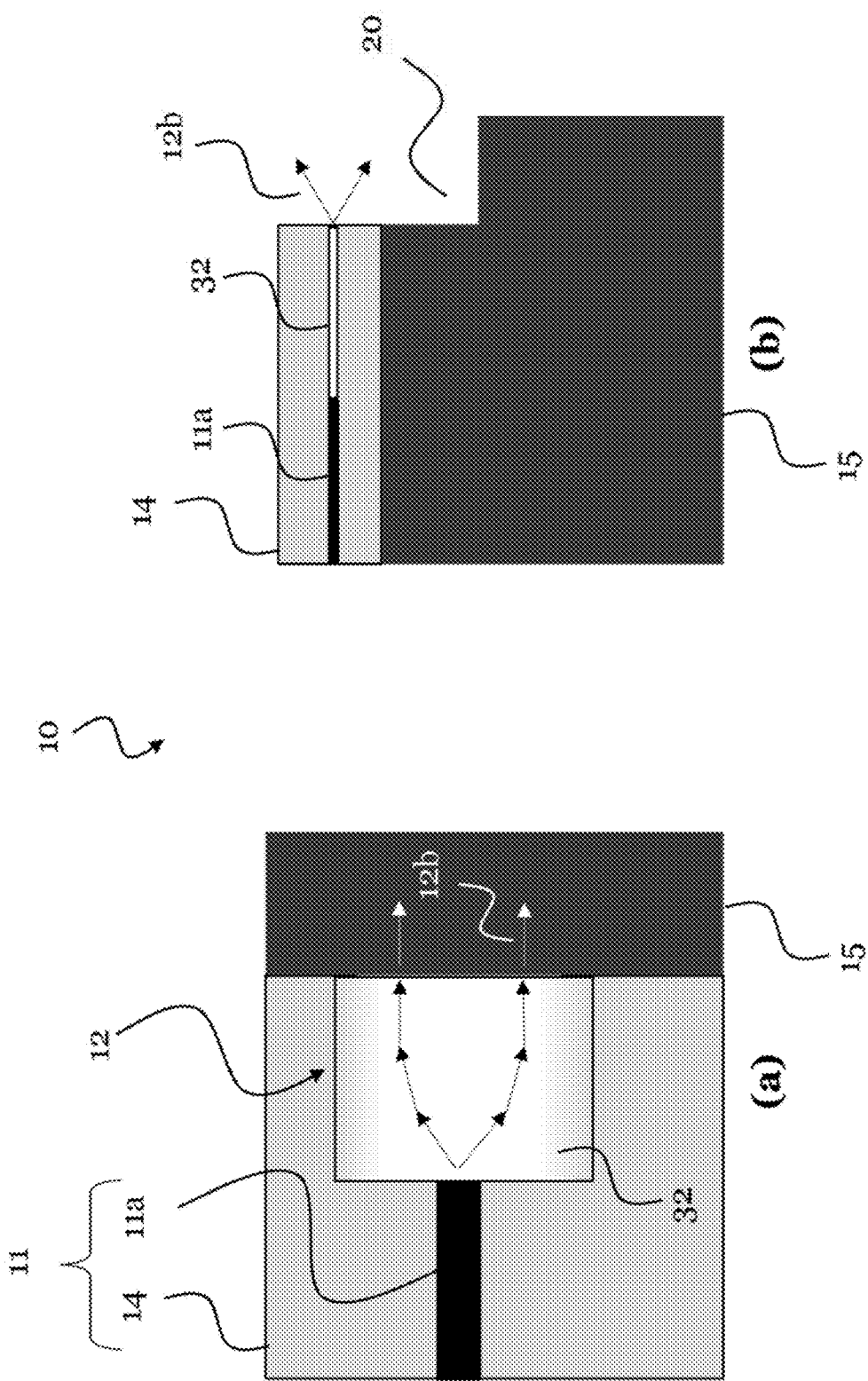
FIG. 3 shows an example of a first optical element of a photonic chip according to an example embodiment.

FIG. 3 shows another example of a first optical element 12 of a photonic chip 10 according to an example embodiment, wherein the first optical element 12 is implemented as an edge coupler. FIG. 3(a) shows a top-view of the photonic chip 10 and FIG. 3(b) shows a cross-section of the photonic chip 10.

In particular, in the example of FIG. 3, the first optical element 12 is based on an in-plane GRIN lens edge coupler. The waveguide 11 (again comprising a waveguide core 11a and a cladding 14), and thus the light beam, is transitioned into a gradient index (GRIN) region 32, in which the light beam is simultaneously expanded and collimated in-plane of the photonic chip 10 (see FIG. 3(a)) to become the expanded light beam 12b. The GRIN region can be based on a gradient doping profile of a compound material, or an arrangement of patterned subwavelength structures, or a combination of both. In the example, the expanded light beam 12b is provided towards the facet of the trench 20 (see FIG. 3(b)) as the expanded light beam 12b. In this example the first optical element 12 comprises the GRIN region 32. The GRIN region 32 may be surrounded by the cladding 14.

Figure 4:
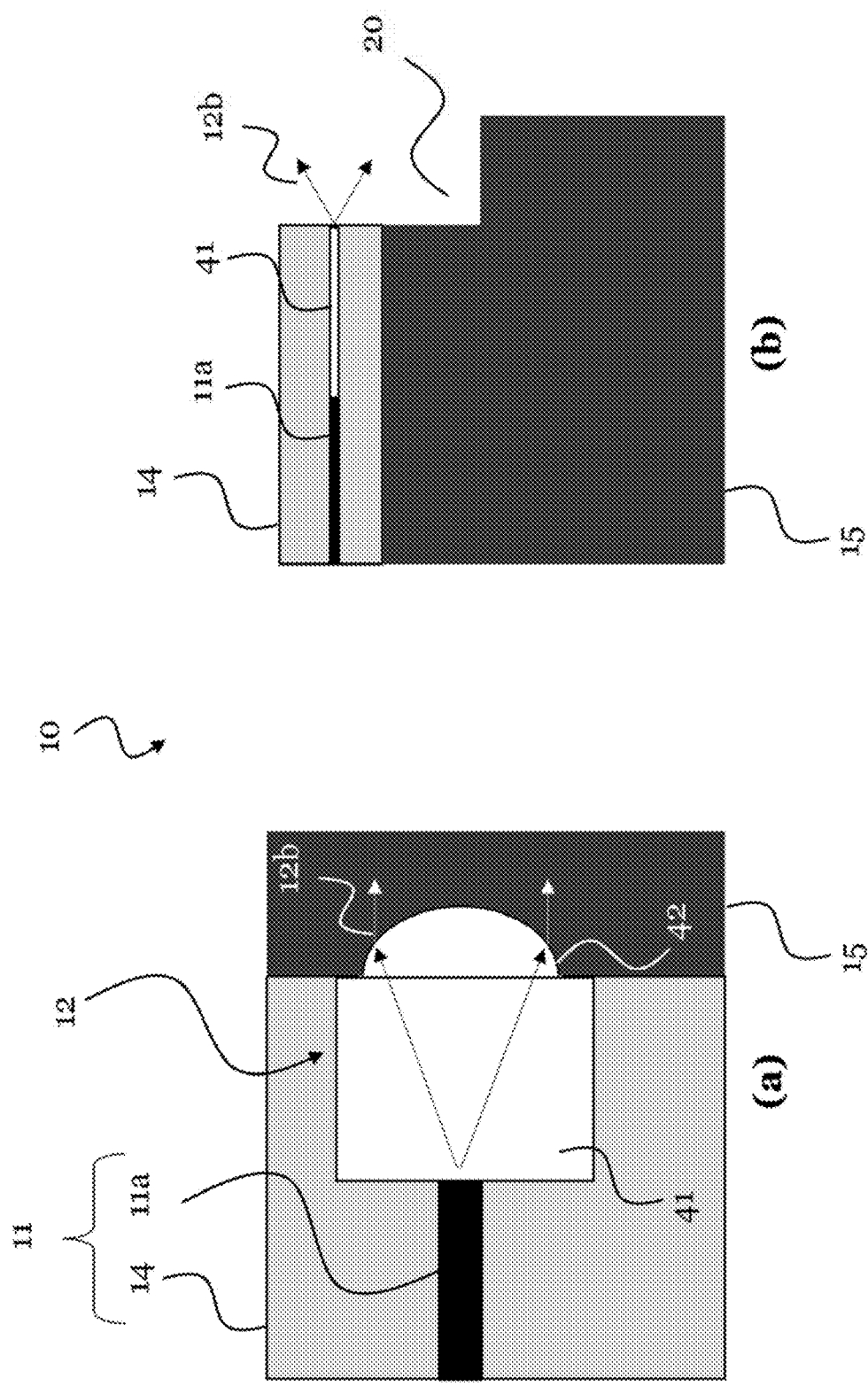
FIG. 4 shows an example of a first optical element of a photonic chip according to an example embodiment.

FIG. 4 shows another example of a first optical element 12 of a photonic chip 10 according to an example embodiment, wherein the first optical element 12 is implemented as an edge coupler. FIG. 4(a) shows a top-view of the photonic chip 10 and FIG. 4(b) shows a cross-section of the photonic chip 10.

In the example of FIG. 4, the first optical element 12 is based on an in-plane convex lens edge coupler. The waveguide 11 (again comprising a waveguide core 11a and a cladding 14), and thus the light beam, is brought abruptly or tapered into a slab region 41, wherein the light beam is expanded (see FIG. 4(a)). Further, an in-plane convex lens 42 may be provided to flatten the phase front of the expanded light beam 12b. The convex lens 42 may be formed at the facet of the trench (see FIG. 4(b)). In this example, the first optical element 12 comprises the slab region 41 and the in-plane convex lens 42. The slab region 41 and/or the lens 42 may be surrounded by the cladding 14.

Figure 5:
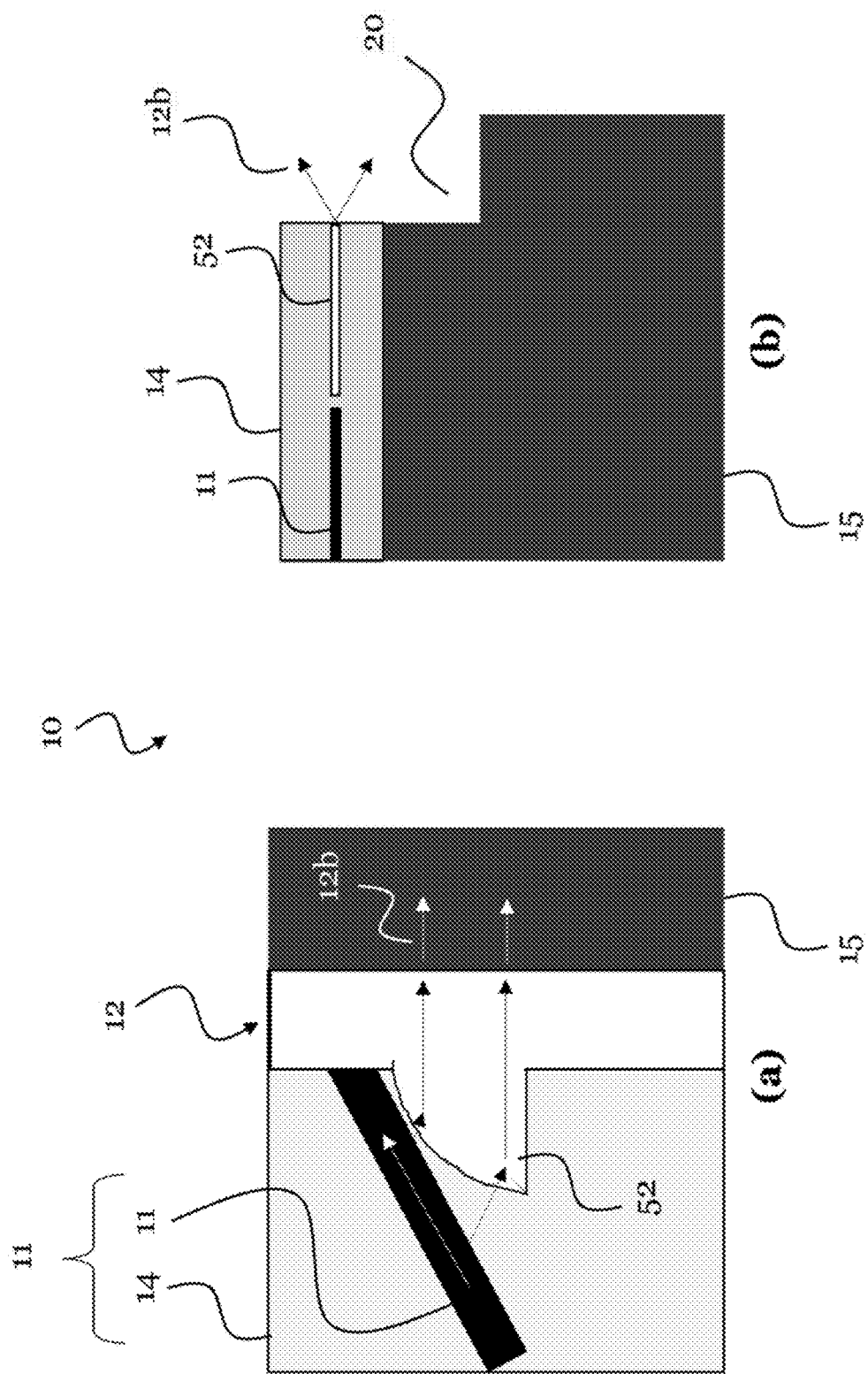
FIG. 5 shows an example of a first optical element of a photonic chip according to an example embodiment.

FIG. 5 shows another example of a first optical element 12 of a photonic chip 10 according to an example embodiment, wherein the first optical element 12 is implemented as an edge coupler. FIG. 5(a) shows a top-view of the photonic chip 10 and FIG. 5(b) shows a cross-section of the photonic chip 10.

In the example of FIG. 5, the first optical element 12 is based on an in-plane evanescent edge coupler. The waveguide 11 (again comprising a waveguide core 11a and a cladding 14), and thus the light beam, is brought close to a slab region 52. In particular, an oxide gap is formed between the waveguide 11 and the slab region 52 (see FIG. 5(a)). The oxide gap is formed such that the waveguide mode of the waveguide 11 is evanescently coupled to the slab mode of the slab region 52, in particular, with a predefined intensity profile. In this example, the first optical element 12 comprises the slab region 52. The slab region 52 may be surrounded by the cladding (see FIG. 5(a)).

In the following, the second stage of the two-stage expansion processes, i.e., the out-of-plane beam expansion of the expanded light beam 12b into the output light beam 13b by the second optical element 13 is described in more detail.

After the first optical element 12 (e.g., implemented as either one of the in-plane edge couplers shown in the FIGS. 2-5), the expanded light beam 12b (e.g., edge emitting beam from the trench facet) has been expanded in the first direction and optionally collimated. The second optical element 13 (e.g., implemented as a mirror, particularly a micromirror) may be fabricated or may be placed in the trench 20, and may be configured to deflect the expanded light beam 12b, for example vertically, and at the same time to further expand and optionally collimate the expanded light beam 12b in the second direction to obtain the output light beam 13b.

There are two main implementations for the second optical element 13. Namely, the mirror may be fabricated in-situ on the photonic chip 10 (e.g., at wafer-level), i.e., the second optical element 13 may be integrated with the silicon-based substrate 15 of the photonic chip 10. Alternatively, the second optical element may be fabricated on another substrate, and may then be transferred in a hybrid manner to the photonic chip 10, e.g., the second optical element 13 may thereby be inserted into the silicon-based substrate 15 of the photonic chip 10.

Figure 6:
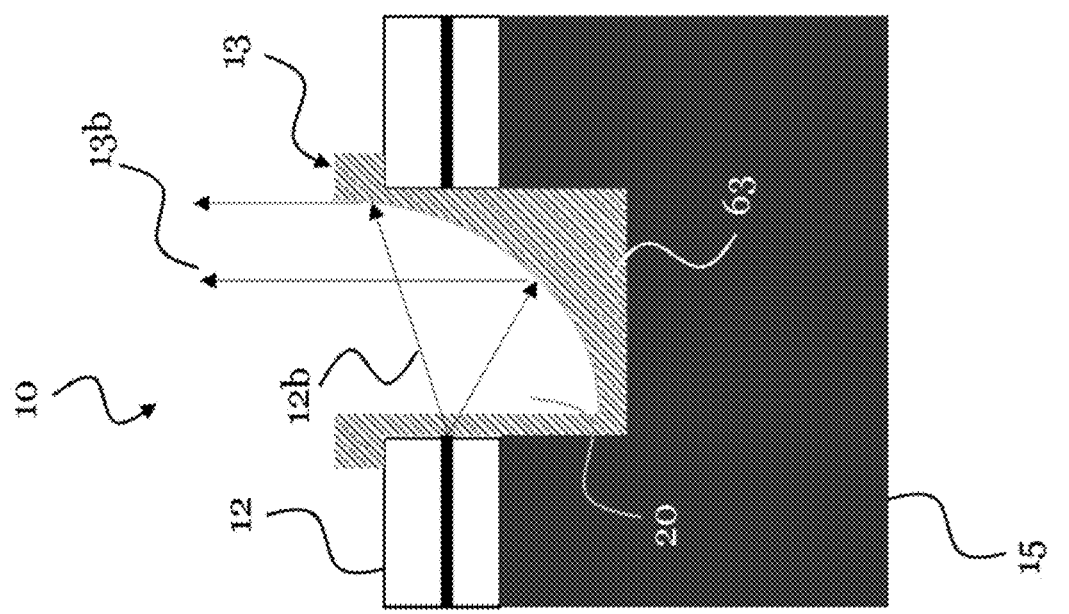
FIG. 6 shows an example of a second optical element of a photonic chip according to an example embodiment.

FIG. 6 shows an example of a second optical element 13 of a photonic chip 10 according to an example embodiment. FIG. 6 shows particularly a cross-section of the photonic chip 10.

In the example of FIG. 6, the second optical element 13 is based on an in-situ mirror 63, which may receive and deflect the expanded light beam 12b to produce the output light beam 13b. For example, the mirror 63 may be configured to deflect the expanded light beam 12b by an angle in a range of 80°-100°, or specifically by an angle of 90°. The mirror 63 may be metallized mirror, e.g., a metallized polymer structure, and may be formed cylindrically. The second optical element 13 comprises the mirror 63.

The mirror 63 may be fabricated by at least one of: laser ablation; direct laser multiphoton lithography; grey-scale lithography; angled dicing or grinding or indenting; controlled anisotropic wet or dry etching.

Figure 7:
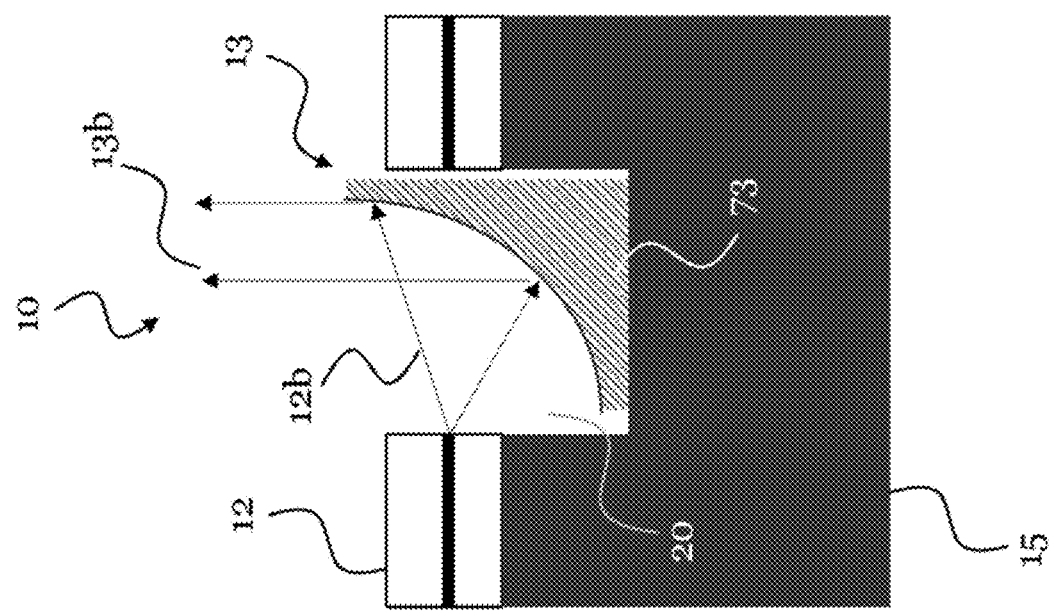
FIG. 7 shows an example of a second optical element of a photonic chip according to an example embodiment.

FIG. 7 shows another example of a second optical element 13 of a photonic chip 10 according to an example embodiment. FIG. 7 shows particularly a cross-section of the photonic chip 10.

In the example of FIG. 7, the second optical element 13 is based on a hybrid mirror, particularly a hybrid micro-mirror 73. The mirror 73 may be metallized mirror, e.g., a metallized polymer structure, and may be formed cylindrically. The second optical element 13 comprises the mirror 73.

The mirror 73 may be fabricated in a separate substrate, and may be transferred to the photonic chip (e.g. at die-level or wafer-level). The mirror 73 may be fabricated by at least one of: laser ablation; grey-scale lithography; nano-imprinting/embossing. The fabricated mirror 73 may be transferred by at least one of the following techniques: pick-and-place, and transfer-printing.

Figure 8:
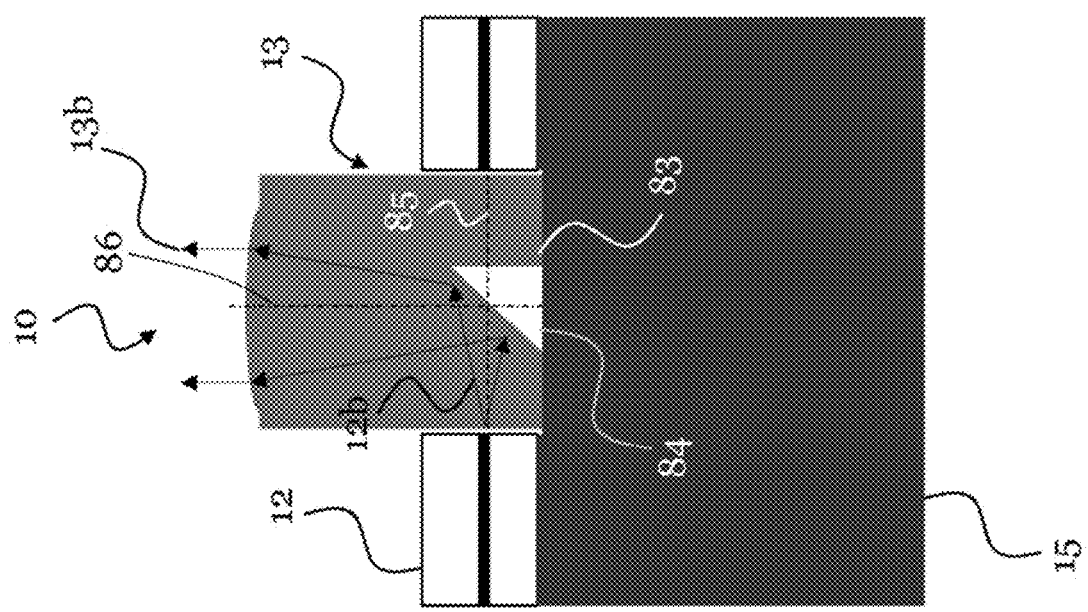
FIG. 8 shows an example of a second optical element of a photonic chip according to an example embodiment.

FIG. 8 shows another example of a second optical element 13 of a photonic chip 10 according to an example embodiment. FIG. 8 shows particularly a cross-section of the photonic chip 10.

In the example of FIG. 8, the second optical element 13 comprises a curved lens 83 with an integrated mirror 84. For example, the curved lens 83 may be a 1D curved lens and the integrated mirror 84 may be a 45° mirror. For example, the curved lens 83 may be a 1D curved microlens. The integrated mirror 84 may receive and deflect the expanded light beam 12b and the curved lens 83 may collimate the deflected expanded light beam 12b, so that the second optical element 13 produces the output light beam 13b. For example, the integrated mirror 84 may be configured to deflect the expanded light beam 12b by an angle in a range of 80°-100°, or specifically by an angle of 90°. The integrated mirror 84 may be metallized mirror, e.g., a metallized polymer structure, or a mirror based on total internal reflection.

The 1D lens 83 with the integrated mirror 84 may be fabricated by at least one of: laser ablation; direct laser multiphoton lithography; grey-scale lithography; angled dicing or grinding or indenting; controlled anisotropic wet or dry etching. The 1D lens 83 may be made of any suitable microlens material, for example, silicon.

By providing the curved lens 83 with the integrated mirror 84, it may be possible to further improve the manufacturability of the photonic chip 10. For example, it may be easier to assemble the second optical element 13 on the photonic chip 10. For instance, as represented by a horizontal line 85 and/or a vertical line 86, the center of the mirror may be aligned with the focal line (1D) of the lens. Hence, it may be easier and faster to place the lens on the photonic chip. Also the precision of placing the second optical element 13 on the photonic chip 10 may be improved. The curved lens 83 with the integrated mirror 84 may be fabricated separately from the rest of the photonic chip 10, and may then be placed as the second optical element 13 onto the photonic chip 10. This enables a fast and precise manufacturing process.

Figure 9:
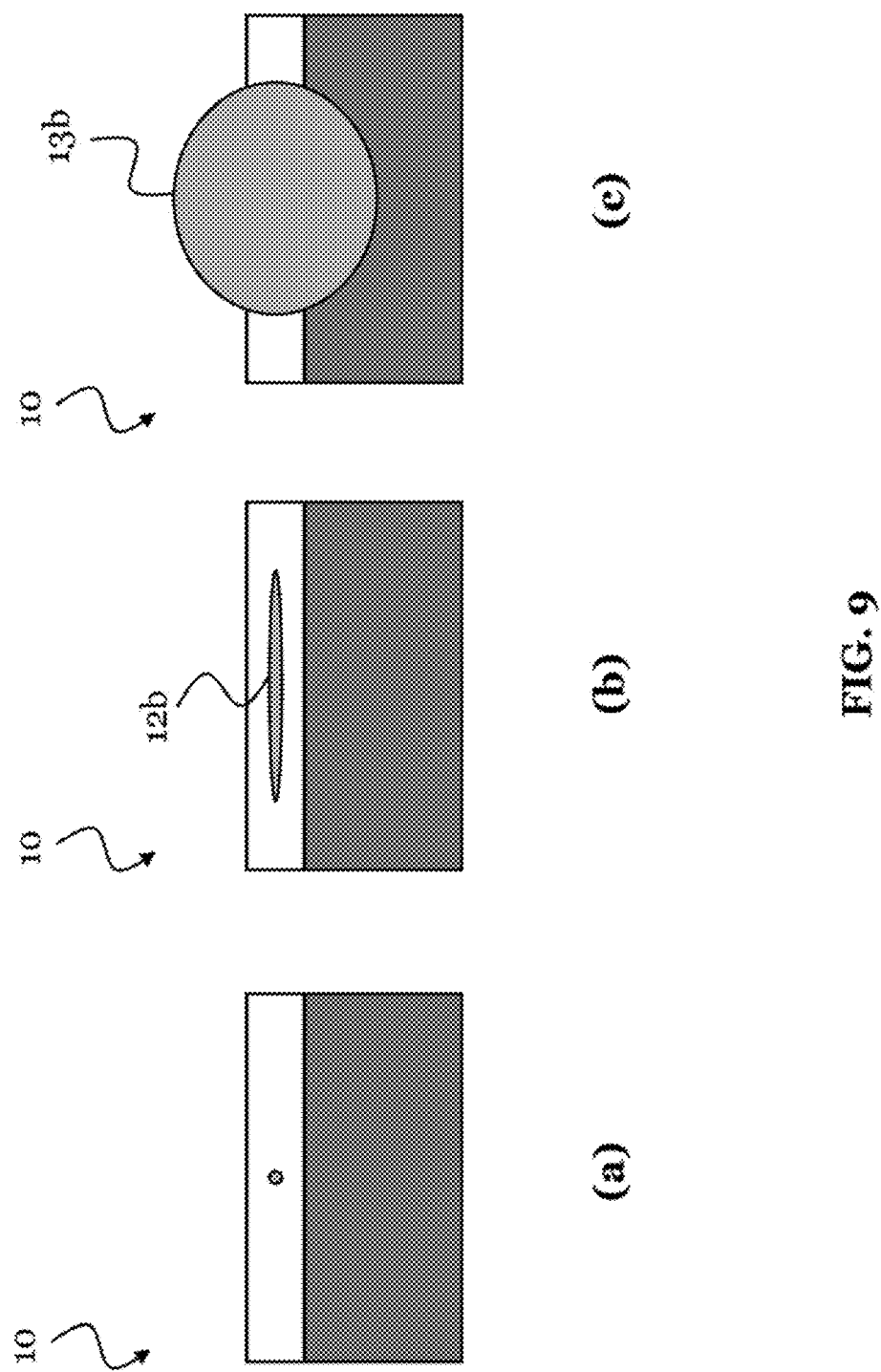
FIG. 9 shows a photonic chip according to an example embodiment.

FIG. 9 shows a photonic chip 10 according to an example embodiment. In particular, FIGS. 9(a), 9(b) and 9(c) show a cross-section of the photonic chip 10 implemented according to any of the previous figures. The photonic chip 10 may be a silicon-based or silicon photonic chip 10.

The photonic chip 10, as an example, comprise a curved lens 83 with an integrated mirror 84, in particular a 1D curved lens with an integrated 45° mirror, as the second optical element 13. The optical chip 10 may further comprise, as an example, a graded index lens as the first optical element 12. For instance, the first optical element 12 may be implemented as shown in FIG. 3. For example, the first optical element 12 may comprise the GRIN region 32. A first optical element 12 based on a graded index lens is easy to integrate into the photonic chip 10, for example, using CMOS technology. Further, such a first optical element 12 can be fabricated very accurately. Thus, in the exemplary combination with the curved lens 83 with the integrated mirror 84 as the second optical element 13, the entire photonic chip 10 can be fabricated most easily and accurately.

FIG. 9(a) shows the optical mode in the photonic chip 10 before the two-stage beam expansion process.

FIG. 9(b) shows the optical mode in the photonic chip 10 after the first stage beam expansion step, i.e., after the in-plane beam expansion caused by the first optical element 12, for example, the graded index lens. In FIG. 9(b), the light beam is accordingly expanded along the in-plane axis of the photonic chip 10—i.e. the expanded light beam 12b is produced—however, the expanded light beam 12b is still confined along the out-of-plane axis of the photonic chip 10.

FIG. 9(c) shows the optical mode in the photonic chip 10 after the second stage beam expansion step, i.e., after the out-of-plane beam expansion caused by the second optical element 13, for example, the curved lens 83 with the integrated mirror 84. In FIG. 9(c), the expanded light beam 12b is further expanded along the out-of-plane axis—i.e. the output light beam 13b is produced. Notably, the beam dimension along the in-plane axis after the second stage may be the same as after the first stage. In other words, the output light beam 13b may have the same in-plane extension as the expanded light beam 12b.

Figure 10:
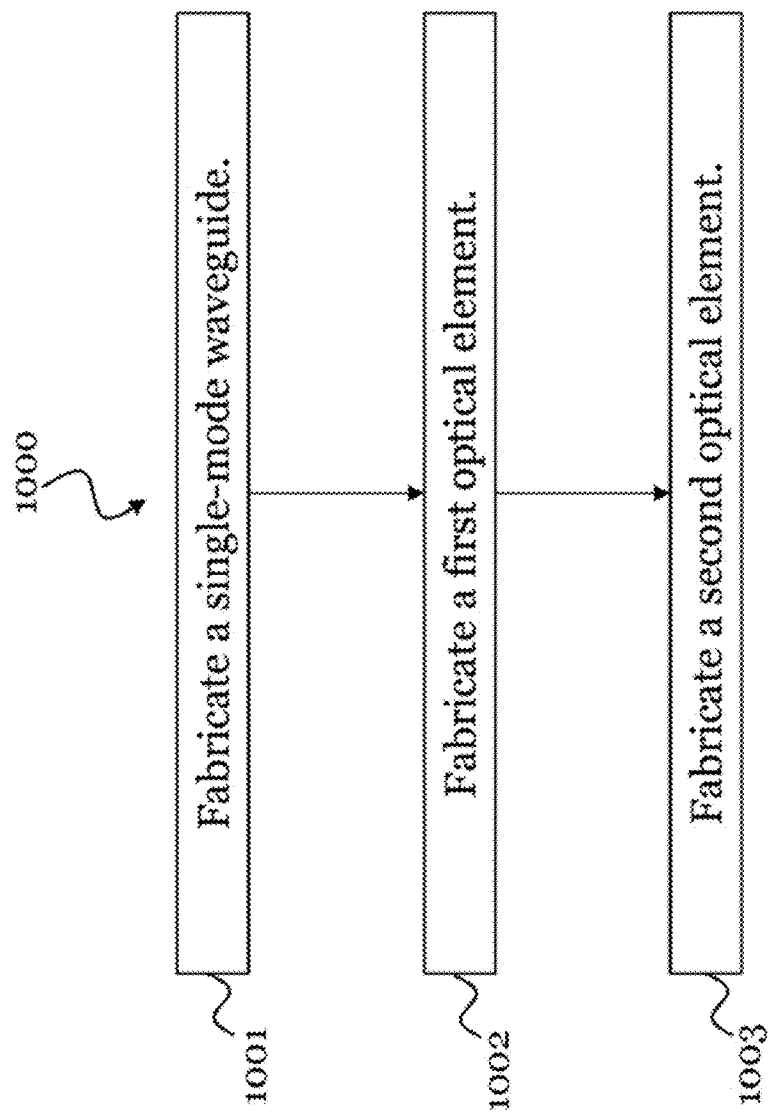
FIG. 10 shows a method for fabricating a photonic chip according to an example embodiment.

FIG. 10 illustrates steps of a method 1000 according to an example embodiment. The method 1000 is suitable for fabricating a photonic chip 10 as shown in the FIGS. 2-9. The method 100 may be performed at wafer-level.

The method 1000 comprises a step 1001 of fabricating a single-mode waveguide configured to guide light and provide a light beam. Further, the method 1000 comprises a step 1002 of fabricating a first optical element 12, wherein the first optical element 12 is arranged and configured to expand the light beam in a first direction in-plane of the photonic chip 10, in order to provide an expanded light beam 12b. The method further comprises a step 1003 of fabricating a second optical element 13, wherein the second optical element 13 is arranged and configured to deflect and at the same time further expand the expanded light beam 12b in a second direction, in order to provide an output light beam 13b out of the photonic chip 10.

In summary, the embodiments described herein provide various advantages. For instance:

Ease of manufacturing: The in-plane optics (first optical element 12) can be fabricated with high precision on the photonic chip 10. For instance, a 1D cylindrical mirror is much easier to fabricate and integrate than a 2D curved mirror.

High bandwidth: The use of a non-grating based in-plane first optical element 12 and out-of-plane second optical element 13 enables high bandwidth compared with grating based optics.

High misalignment and dust tolerance: The interface, which provides the expanded output light beam 13b, allows for an increased alignment tolerance (e.g., 5 μm), thus making it suitable for pluggable and dust tolerant optical connectors.

Wafer-level packaging: The vertical I/O interface is beneficial for vision-based alignments, flexible 2D placements, wafer-level testing, etc. during wafer-level packaging. In addition, the low height profile (especially compared with ones with surface-mount micro-lenses) makes it compatible with other planar processes (such as molding, flip-chip, grinding, polishing, etc.) and co-packaged module components (such as heatsink, electronic chiplets, etc.).

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A silicon-based photonic chip comprising an interface for optically coupling the photonic chip to an optical fiber or an optical fiber assembly, wherein the interface comprises:
   a single-mode waveguide configured to guide light and to provide a first light beam;
   a first optical element configured to expand the first light beam in a first direction that is in-plane of the photonic chip and to confine the first light beam in a direction that is perpendicular to the plane of the photonic chip, thereby providing an expanded light beam; and
   a second optical element configured to deflect the expanded light beam and to further expand the expanded light beam in a second direction that is perpendicular to the first direction, thereby providing an output light beam from the photonic chip having a beam dimension in the first direction that is the same as a beam dimension in the first direction of the expanded light beam provided by the first optical element.

2. The photonic chip of claim 1, wherein:
   the first optical element is configured to shape the expanded light beam.

3. The photonic chip of claim 1, wherein the second optical element is configured to shape the output light beam.

4. The photonic chip of claim 1, wherein:
   the second optical element is configured to deflect the expanded light beam by an angle in a range of 80°-100° relative to the first direction.

5. The photonic chip of claim 1, wherein:
   the first light beam has a beam diameter in a range of 0.5-1.5 µm; and
   the output light beam has a beam diameter larger than 10 µm.

6. The photonic chip of claim 1, wherein:
   the first optical element comprises silicon and is patterned on a silicon-based substrate of the photonic chip.

7. The photonic chip of claim 1, wherein:
   the second optical element is integrated with or inserted into a silicon-based substrate of the photonic chip.

8. The photonic chip of claim 1, wherein:
   the first optical element is disposed in-plane relative to the photonic chip and comprises at least one of:
   a convex lens;
   a graded index lens;
   a slab coupler evanescently coupled to the single-mode waveguide;
   a light reflective element; or
   a micro-mirror.

9. The photonic chip of claim 1, wherein:
   the second optical element comprises at least one of:
   a cylindrical light-reflective element;
   a metallized polymer structure; or
   a micro-mirror.

10. The photonic chip of claim 1, wherein:
    the second optical element comprises a curved lens with an integrated mirror.

11. The photonic chip of claim 10, wherein:
    the curved lens is a 1D curved lens and the integrated mirror is a 45° mirror.

12. The photonic chip of claim 1, further comprising:
    a trench disposed at least partly between the first optical element and the second optical element such that a path of the expanded light beam from the first optical element to the second optical element goes through at least a part of the trench.

13. The photonic chip of claim 12, wherein:
    the second optical element is disposed within the trench.

14. The photonic chip of claim 13, further comprising:
    a dielectric material disposed within the trench and at least partially surrounding the second optical element.

15. The photonic chip of claim 12, wherein:
    the second optical element comprises an edge coupler arranged at an edge of the photonic chip, the edge of the photonic chip being at least partially defined by the trench.

16. A method for fabricating a silicon-based photonic chip that comprises an interface for optically coupling the photonic chip to an optical fiber or an optical fiber assembly, wherein the method comprises:
    fabricating a single-mode waveguide configured to guide light and to provide a first light beam;
    fabricating a first optical element, wherein the first optical element is configured to expand the first light beam in a first direction that is in-plane relative to the photonic chip and to confine the first light beam in a direction that is perpendicular to the plane of the photonic chip, thereby providing an expanded light beam; and
    fabricating a second optical element, wherein the second optical element is configured to deflect the expanded light beam and to further expand the expanded light beam in a second direction that is perpendicular to the first direction, thereby providing an output light beam out of the photonic chip having a beam dimension in the first direction that is the same as a beam dimension in the first direction of the expanded light beam provided by the first optical element.

17. The method of claim 16, wherein the first optical element comprises silicon, and wherein fabricating the first optical element comprises patterning the first optical element on a silicon-based substrate of the photonic chip.

18. The method of claim 16, further comprising: inserting the second optical element into a silicon-based substrate of the photonic chip.

19. The method of claim 16, wherein the first optical element comprises at least one of a convex lens, a graded index lens, a slab coupler evanescently coupled to the single-mode waveguide, a light reflective element, or a micro-mirror.

20. The method of claim 16, wherein the second optical element comprises at least one of a cylindrical light-reflective element, a metallized polymer structure, or a micro-mirror.

* * * * *